United States Patent
Betteridge et al.

(10) Patent No.: US 10,851,863 B2
(45) Date of Patent: Dec. 1, 2020

(54) IMPACT ABSORBING MATTING AND PADDING SYSTEM WITH ELASTOMERIC SUB-SURFACE STRUCTURE

(71) Applicants: Bryce L. Betteridge, University Place, WA (US); Robert Samuel Bishop, Chehalis, WA (US)

(72) Inventors: Bryce L. Betteridge, University Place, WA (US); Robert Samuel Bishop, Chehalis, WA (US)

( * ) Notice: Subject to any disclaimer, the term of this patent is extended or adjusted under 35 U.S.C. 154(b) by 0 days.

(21) Appl. No.: 15/618,109

(22) Filed: Jun. 8, 2017

(65) Prior Publication Data
US 2017/0356517 A1    Dec. 14, 2017

Related U.S. Application Data

(60) Provisional application No. 62/348,117, filed on Jun. 9, 2016.

(51) Int. Cl.
| | |
|---|---|
| *F16F 7/12* | (2006.01) |
| *B32B 3/26* | (2006.01) |
| *B32B 3/30* | (2006.01) |
| *F16F 1/376* | (2006.01) |
| *A41D 31/28* | (2019.01) |
| *A41D 13/015* | (2006.01) |

(Continued)

(52) U.S. Cl.
CPC ............... *F16F 7/121* (2013.01); *A43B 7/14* (2013.01); *A43B 13/181* (2013.01); *A43B 13/187* (2013.01); *B32B 3/08* (2013.01); *B32B 3/26* (2013.01); *B32B 3/30* (2013.01); *B32B 25/042* (2013.01); *F16F 1/376* (2013.01); *A41D 13/0156* (2013.01); *A41D 31/28* (2019.02); *A63B 71/08* (2013.01); *B32B 2250/02* (2013.01); *B32B 2250/248* (2013.01); *B32B 2307/558* (2013.01); *B32B 2307/56* (2013.01); *B32B 2437/00* (2013.01); *B32B 2471/04* (2013.01); *B32B 2571/00* (2013.01)

(58) Field of Classification Search
CPC ... F16F 7/121; F16F 1/376; F16F 1/36; A43B 7/14; A43B 13/181; A43B 13/187; B32B 3/30; B32B 2307/56; B32B 2437/00; B32B 2571/00; B32B 25/08; A41D 13/0156; A41D 31/0044; A63B 71/08; E04F 15/10; E04F 15/22; A47G 27/0231; A63C 19/04; E01C 13/00
See application file for complete search history.

(56) References Cited

U.S. PATENT DOCUMENTS

| | | | | |
|---|---|---|---|---|
| 3,948,500 A | * | 4/1976 | Korbuly | E02B 3/26 267/140 |
| 2003/0186025 A1 | * | 10/2003 | Scott | B32B 7/02 428/119 |
| 2010/0098914 A1 | * | 4/2010 | Scott | B32B 7/02 428/172 |

* cited by examiner

*Primary Examiner* — Patricia L. Nordmeyer
(74) *Attorney, Agent, or Firm* — Patrick M Dwyer

(57) ABSTRACT

A cushioning and impact absorbing pad system with a surface layer of thickness t, and an elastomeric sub-surface structure of height h. The sub-surface structure comprises an array of elastomeric columns wherein each column has a frustoconical column wall surrounding a central void. The frustoconical column walls have a zone that is a more compressible, relatively collapsible zone in a region at an end of the column opposite the surface layer and a zone that is a relatively less compressible zone in a region at the end of the column abutting the surface layer. Column walls are tapered with draft angles in the range of greater than 6 degrees and less than 10 degrees.

7 Claims, 6 Drawing Sheets

(51) Int. Cl.
*A43B 7/14* (2006.01)
*A43B 13/18* (2006.01)
*B32B 25/04* (2006.01)
*B32B 3/08* (2006.01)
*A63B 71/08* (2006.01)

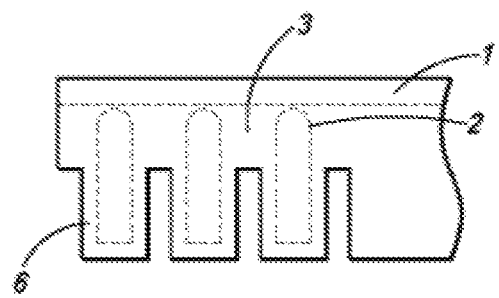
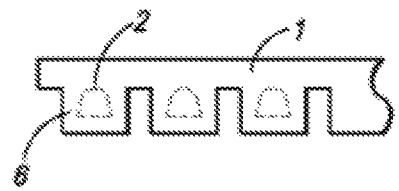
Figure 1  Figure 2
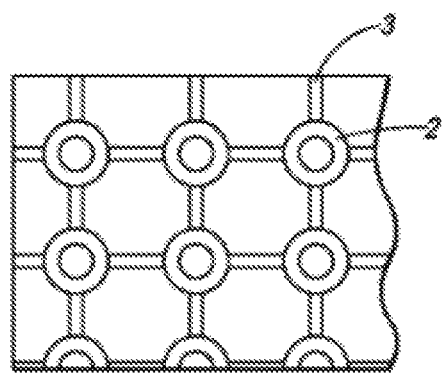
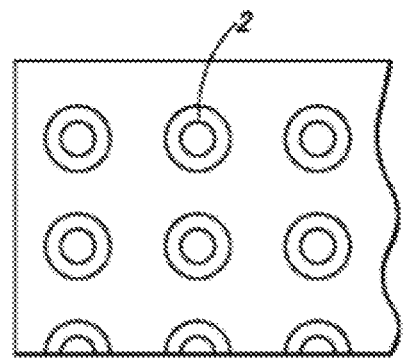
Figure 3  Figure 4

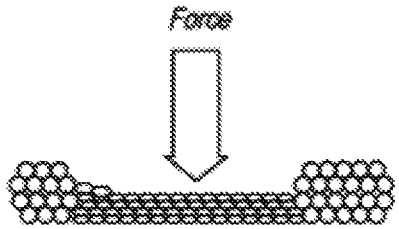
Figure 5A
[Prior Art]
Figure 5B
[Prior Art]
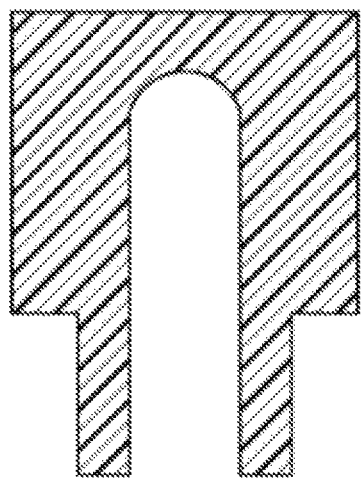
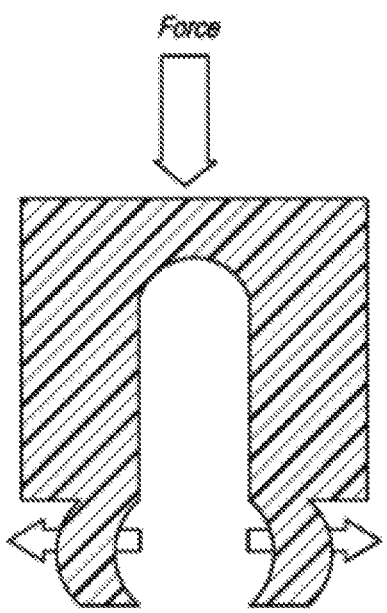
Figure 6A
Figure 6B

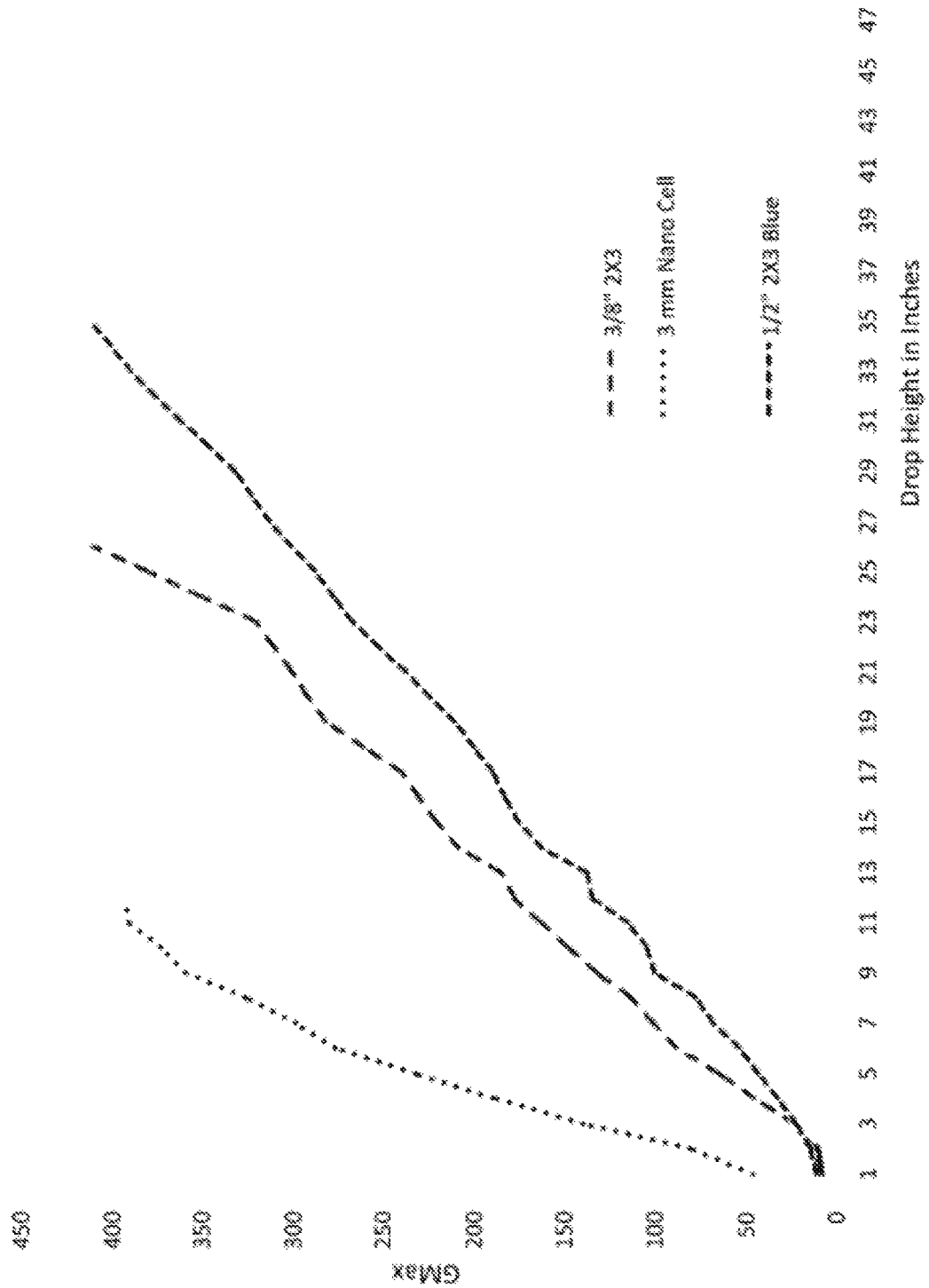

IMPACT ABSORBING MATTING AND PADDING SYSTEM WITH ELASTOMERIC SUB-SURFACE STRUCTURE

This application claims priority to U.S. Provisional Patent Application 62/348,117 files Jun. 9, 2016 and is hereby incorporated as if fully set forth herein.

TECHNICAL HELD

The invention relates to systems for attenuating applied force and absorbing impact energy; more particularly, it relates to anti-fatigue and stabilizing padding with elastomeric subsurface structures for attenuating applied force and absorbing impact energy; more particularly it relates to impact absorbing, anti-fatigue matting systems and impact absorbing, stabilizing padding with elastomeric subsurface structures and deformable structures for attenuating applied force and absorbing impact energy for use on surfaces in healthcare, recreation, industry and home, and as padding in sports equipment, footwear and body padding.

BACKGROUND OF THE INVENTION

Conventionally, some kind of matting system is used to relieve standing stress and fatigue or to attenuate impact stress. Many such systems are known. Some mats use closed-cell foam or vulcanized rubber chips bound together to provide a cushioning and shock absorbing structure. Others use an array of deformable elastomeric cells, often horizontally tubular in shape, and with a constant wall thickness to the tubular structures. The cells might or might not have an elastomeric surface layer. The problems with most conventional matting systems are many.

Most conventional impact attenuating structures get harder as the force applied to them increases. Their cushioning capability is therefore least available when it is most needed. Foam mats particularly compress to a hardness that does not provide adequate support or cushioning. In addition, foam materials can easily bottom out, allowing potentially injurious impact right through the mat and onto the harder floor surface beneath.

Also, foam and other generally compressible materials do not return rapidly to a former height and shape. A surface that is slow to respond when pressure is released will be partially compressed as a load is repeatedly placed on it, and any positive effect of the cushioning will be lost. This is especially true with prolonged standing as foam and other materials become more and more permanently compressed over time. Conventional systems tend to compact with time, thus leading to both localized and generalized compaction and hardening of the energy absorption layer.

In an attempt to minimize this degradation, dense rubber has been used in addition to integrated foam for the pad material. However, the mats are seldom increased in thickness to compensate for the addition of dense rubber, and therefore it reduces the amount of the more impact-absorbing material for a given height of mat. Dense forms of rubber do not provide bottoming-out protection and are relatively incompressible providing little anti-fatigue benefit.

Standing for long periods often leads to edema (swelling) of the lower legs and feet and anti-fatigue matting can provide relief. The conventional view is that soft surfaces cause more adjustments to posture, activating the venous pumping that returns blood to the heart, thus reducing swelling and discomfort. However, it has long been known that anti-fatigue matting must optimize cushioning vs. stability. Too soft and a mat may actually increase fatigue (imagine standing and working on a mattress). In addition, when a mat is too soft, the instability will require an unwarranted amount of muscular activity as the body works to retain balance. This will actually accelerate muscular fatigue, and all its accompanying ills, such as back, hip, knee, ankle and foot pain. However, a mat that is too hard, or that bottoms out easily with normal standing and moving weight, will not be appreciatively better than standing on no mat at all.

What is needed is a matting system that provides the optimum amount of cushioning, with enough instability to encourage small postural changes and increase blood flow to and from working muscles, but not so much instability that it requires excessive and fatiguing muscular activity.

In addition, in most conventional systems, the force absorbing mechanism begins with an immediate displacement at the very surface of the mat, a displacement that often leads to dangerous foot entrapment and/or other displacement instability for those who play, walk or work on such a surface. As most conventional mats are compressed, the surface area around the foot is deformed and creates a situation where the subject is working, walking or standing on an uneven surface. This leads to additional fatigue as the worker is constantly, if subtly, walking uphill with each foot movement. Closed cell foam systems, especially, provide dangerous surface deformation levels that often lead to foot lock or foot entrapment on surfaces having a foam substructure. Even if the worker does not slip or trip, dealing with the uneven surface causes additional fatigue.

There has also been increasing demand for thinner and less apparent anti-fatigue matting. In working situations, where the height of a work surface is standardized, the thickness of anti-fatigue matting is problematic. Workers become used to the work surface being at a relative distance to their hands and eyes, and resist 'raising the floor'. While mat heights of 25 to 75 mm were at one time considered optimal, that has changed, and a demand for thinner mats has impacted the market.

Our own previously patented advances in the field of shock-attenuating matting led to a breakthrough in many if not all of the above noted problem aspects. In the realm of materials comprised of deformable cells ranging in height from 25 to 75 mm or so, our patented technology does an excellent job. However, as a need has developed in recent years for ever smaller cells in thinner materials, it became evident to us that our previous formulations in cell shapes, dimensions, and height ratios (of more compressible to less compressible regions) would not result in impact absorbing material that could perform at comparable levels with our previous innovations. This has been true not only in the field of surface matting but also especially in materials intended for use, and thin enough to fit, inside of footwear.

Pads found in the soles of athletic sloes have become highly developed for impact, shock absorption and stabilization. Until recent years, there was little disagreement that shoes for sports involving ground impact—such as running, jogging, court sports, field sports, and aerobic dancing—should have ample cushioning to absorb shock. However, there has been considerable controversy as to the benefits of cushioning in athletic footwear over the last decade. Nevertheless, an article published in 2016 by The American Orthopaedic Foot & Ankle Society (AOFAS) jointly with the American Academy of Orthopaedic Surgeons reports: "No data exist to say which type of shoe is better," and recommends that athletes should "look for overall shock absorption for the foot and good heel control." They further state, "Although not a cure-all, these qualities in [an athletic] shoe may help prevent shin splints, tendinitis, heel pain, stress fractures and other overuse syndromes."

Again, many systems for providing cushioning in athletic shoes are used. Some use closed-cell foam, gel or liquid. Others use relatively large pockets of pressurized gas. Others use an array of deformable elastomeric cells, either solid cells arrayed with varying space between the cells or grid-like structures of open cells, which can allow for the bendability such applications require. Others use variously shaped elastomeric structures forming wave-like or horizontally tubular patterns, or bellows which deform on impact. All of these systems exhibit the difficulties of any padding system, many of which have been dismissed above.

Foam, gels and liquid tend to be heavy. Foam particularly bottoms out and breaks down quickly with use. Other elastomeric structures get harder as the force applied to them increases, and also bottom out suddenly when the tube, wave or bellows flattens.

In addition, problems arise because, discussed above, these systems must balance cushioning with stability. Often, in conventional systems, the more cushioning a material or structure provides, the less stability it provides, allowing for sports related injury and reduced performance. Some manufacturers of sports shoes advertise the advantage of creating instability with their footwear in order to tone muscles by making normal walking or running similar to training on a balance ball. However, this additional muscular training is at the expense of performance. After all, the purpose of sports equipment and shoes are to deliver the maximum force in the correct direction to achieve the desired sporting outcome without causing injury or undue muscle fatigue.

As with the mats discussed above, most pads used in sports equipment and sports shoes are designed such that they begin with an immediate displacement at the surface of impact, causing dangerous and directionally-unpredictable deformation.

There is also a need for durability. Unlike the safety and anti-fatigue matting discussed above, in footwear the entire surface of the pad will be compressed with each use. The American Academy of Podiatric Sports Medicine warned in 2013 that after approximately 350 to 550 miles of use, most running shoes will lose their shock absorption. Similar statistics are found in any sport application where the entire pad will experience compression with each use.

What is needed in the field of impact-absorbing padding and anti-fatigue matting is a new system that can perform in applications requiring thinner and smaller measurement, while still exhibiting little or no surface deformation at working loads, and which is resilient at levels below the surface to attenuate fatigue and injury causing factors by safely absorbing body impact.

DISCLOSURE OF THE INVENTION

An impact-absorbing padding system with a preferably continuous array of elastomeric subsurface structures is disclosed for use beneath a surface layer for anti-fatigue matting and for use in athletic equipment and shoes. The elastomeric subsurface structures are preferably geometric in shape, such as, for example, cylindrical shapes surrounding a void, the void optionally ending in a dome. The array of defined structures described herein is effective at providing anti-fatigue and athletic impact attenuation with a relatively more stable, relatively less deformable surface layer. The system provides adequate stability and yet provides effective impact and bottoming-out protection.

Disclosed embodiments may advantageously be used in work environments where standing and/or walking fatigue needs to be attenuated, without substantially diminishing the distance between the floor and a work surface. In other words, where a relatively thinner matting system is required. Examples of such environments are manufacturing facilities, retail stores, hospitals and medical centers, floral shops, and any other situations where workers must stand for long periods of their workday, or spend time walking over otherwise unprotected flooring, ground, asphalt, or concrete.

Other miscellaneous uses where the disclosed protective surfacing system can be used are physical therapy rooms for the disabled and the elderly, operating rooms in veterinary clinics and the walls of sport courts, patient rooms and the like. Other disclosed embodiments may advantageously be used in the cushioning and stabilizing systems of athletic shoes, such as shoes for hiking, running, jogging, court and field sports and aerobic exercise.

A novel resilient pad system is disclosed. One embodiment of the pad system includes a substructure of a plurality of supporting resilient substructure hollow columns, each column having a column wall, forming the column, and a first end and an enclosed second end. The column wall surrounds a central void, the void extending from the first end to the enclosed second end of the column. The column wall also has a cross-sectional thickness that is thinner at the first end of the wall than at the enclosed second end of the wall. The part of the wall that abuts the first end of the column is a more collapsible zone where the cross-section of the column wall is thinner, relative to a less collapsible zone in a region abutting the second end of the wall where the cross-section is thicker.

The pad system also has a cross-sectional pad thickness T. Each central void defined by the column walls has a relatively uniform height h within the cross-sectional thickness T, and a cross-sectional thickness t extends beyond the enclosed end of the central voids within the cross-sectional thickness T, such that T=t+h. Advantageously, in some embodiments, the ratio of h:t is greater than 1.3 and less than 3.5.

In addition, for some embodiments, the cross-sectional thickness of the column wall increases from the first end to the enclosed second end by a percentage within a range of greater than 125% and less than 140%.

In some embodiments, the column wall tapers, forming a frustoconically shaped column. A column wall will have an inside surface and an outside surface, and therefore in some embodiments the column wall is tapered both inside and out, and has draft angles for both the inside surface and the outside surface of the wall as defined above. In some embodiments the outside draft angle is greater than 6 degrees and less than 10 degrees and the inside draft angle greater than 6 degrees and less than 10 degrees. The outside draft angle may be greater than the inside draft angle, or the outside draft angle may be approximately equal to the inside draft angle.

Advantageously, in some embodiments the column wall increases in thickness to meet and form a dome at the enclosed end.

The columns discussed above may be shaped in horizontal cross section in any elliptical or many-sided regular or irregular shape (such as for example, but not limited to, hexagonal or octagonal shape).

The elastomeric structures disclosed preferably flex more at the first end of the columns than at the enclosed layer of the substructure. When used in a matting system, this reduces foot entrapment effects and other surface disturbances around the foot. In anti-fatigue mats, athletic footwear and athletic equipment, this provides adequate stability, even while providing adequate impact attenuation and cushioning. Preferred structures provide greater protection against bottoming out (also referred to as sudden loss of impact attenuation) by providing a structure with at least two zones of different compressibility as discussed above.

Disclosed structures also isolate and absorb vibrations induced by sources of turning, impacting or bouncing induced vibrations, such as found in the turning of propellers, working engines, other machinery, or the rolling of wheels over non-smooth surfaces.

Preferred embodiments provide a surface that feels 'softer' to a standing person as load is applied from the weight of the person, but that essentially immediately returns to its resting shape alter the worker moves to a different location on the mat or off of the mat. Preferred elastomeric mats have a top surface that is supported by multiple flexing elastomeric cylinders or columns that are more readily deformable or compressible, and actually flex more, at the floor surface than at the top surface. This structure provides a more stable work surface.

Preferred embodiments provide impact attenuation to a foot impacting the ground during athletics activities as well, while at the same time providing a surface layer stability that stabilizes the foot, because the multiple flexing elastomeric cylinders or columns are more readily deformable or compressible at the lower surface than at the surface closer to the sole of the foot.

BRIEF DESCRIPTION OF THE DRAWINGS

FIG. 1 is a cross-sectional view of one embodiment of elastomeric mat.

FIG. 2 is a cross-sectional view of an alternate embodiment of elastomeric mat.

FIG. 3 is a bottom plan view of the mat of FIG. 1.

FIG. 4 is a bottom plan view of the mat of FIG. 2.

FIGS. 5A and 5B are schematics of a conventional cell foam cushion at rest and under load, respectively.

FIGS. 6A and 6B are pictures of disclosed embodiments of elastomeric structure, at rest and under load, respectively.

FIG. 11 is a graph of peak impact force vs drop height for selected embodiments.

BEST MODE OF CARRYING OUT THE INVENTION

Figure 7:
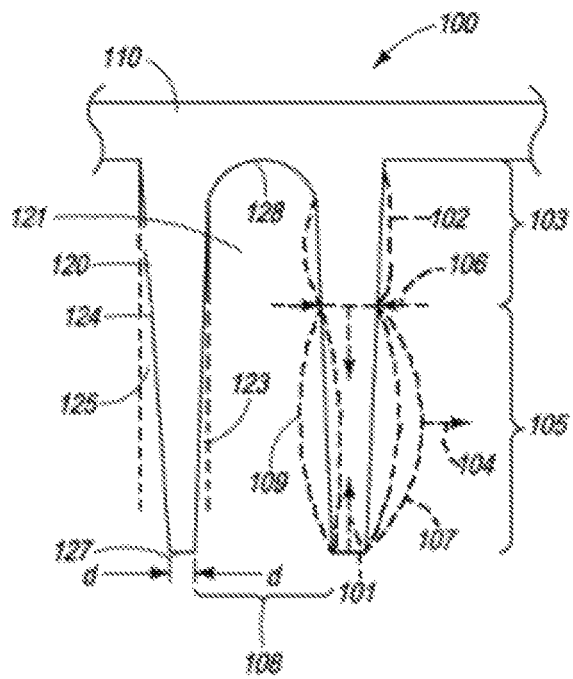
FIG. 7 is a sectional elevation of an embodiment of the disclosed mat with certain elements exaggerated for clarity.

Turning now to the drawings, the invention will be described in a preferred embodiment by reference to the numerals of the drawing figures wherein like numbers indicate like parts.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Reference throughout this specification to a "column" refers to a tubular shafted support structure, typically having a cylindrical of polygonal abaft and two shaft ends. Similarly, references throughout this specification to a "cylinder" refers to a tubular shafted support structure, also with two shaft ends.

Reference throughout this specification to a "column end" refers to the set of points at which the column shaft is considered to end. A column end may be open or enclosed. Generally, the columns referenced in this specification have a central axis and the column ends are defined by the ending of the column shaft at a virtual plane of intersection which is approximately perpendicular to the central axis of the column. However, an enclosed column end may be domed, dimpled or of any other shape on the inside surface or the outside surface of the column.

Generally, the columns referenced in this specification are hollow columns, having a central void surrounded by a continuous, curved "column wall" defining the shaft or curved surface of the column. A column wall may be of generally consistent cross-sectional thickness or of variable cross-sectional thickness, for example relatively thicker at one end and thinner at the other end of the column.

The term "conical" is used throughout this specification to reference a shape generally described by the common advanced-geometric definition of a cone. A cone is any three-dimensional shape that is formed by a set of line segments connecting a common point the apex, to all of a set of points on a base, the base being in a plane that does not contain the apex. Note that the base need not be restricted to a set of points forming a circle; the base may be any shape, formed from any set of points. For example, a cone with a polygonal base forms a pyramid, and a cone with an elliptical base forms an elliptical cone.

Reference throughout this specification to a "frustoconical" shape refers to a conical shape that has the pointed apex truncated, such that the basal part of the cone remains, and the cone extends from the set of points forming the base of the cone to a set of points in a plane, the plane being approximately perpendicular to the central axis of the cone.

Reference throughout this specification to an "outside draft angle" and an "inside draft angle" refers to following angles. Commonly, the perimeter of the base of a cone is called the directrix, and the line segment between the directrix and apex is a generatrix of the lateral surface. In the case of a hollow column which is conically-shaped with column wall thickness, there will be two cones, one inside the other to form the column. Both cones approximately share a central axis. One cone's lateral surface forms the outside lateral surface of the column shaft, and one cone's lateral surface forms the inner lateral surface of the column shaft. The outside draft angle is the angle formed between a generatrix of the outside lateral surface and the common central axis. The inside draft angle is the angle formed between a generatrix of the inner lateral surface and the common central axis.

Reference throughout this specification to "bottoming out" refers to a point where a cushioning material or structure reaches a state where relatively little further deformation is possible in the direction of force.

FIG. 1 is a cross-sectional view of one embodiment of elastomeric pad with domed cylinders 2, a surface layer 1 abutting the domed cylinders and elastomeric linkages or bridges 3. FIG. 2 is a cross-sectional view of an alternate embodiment of elastomeric pad with domed cylinders, sloped or tapered walls, and a surface layer abutting the domed cylinders, and without elastomeric bridges. FIGS. 3 and 4 are plan views of the pads of FIGS. 1 and 2, respectively, as seen from the sub-structure surface. Elastomeric pad 4 may be made from any of several conventional rubber formulae or other conventional elastomer molding technology.

Elastomeric pad 4 has a surface layer 1 with subsurface hollow domed cylinders 2. These elastomeric cylinders may or may not be tapered on the inside of the cylinder as can be seen at 2 in FIG. 2 (exaggerated). A first zone 6 of cylinder 2 is the zone that first flexes or deforms or collapses as load is gradually applied to surface 1 of pad 4.

Elastomeric bridges or linkages 3 link cylinders 2 together in some embodiments. Such linkages provide added stability and rigidity to an upper zone of cylinder 2 and render the upper zone relatively incollapsible as load is applied, as compared with the relatively more flexible, compressible, and collapsible first zone 6 of cylinders 2 which do not have such linkages.

FIGS. 5A and 5B are schematics of conventional closed cell foam cushion at rest and under load, respectively. In FIG. 5B, the foam cushion shows an unstable condition as the surface deforms under the load, leading potentially to dangerous binding of a foot due to the surface deformation. Impact energy is absorbed by crushing the foam cells from top to bottom, and the material gets just gets 'harder' under load.

FIGS. 6A and 6B are pictures of disclosed embodiments of the elastomeric structure, at rest and under load, respectively. Note that as the structure takes impact or load, surface deformation is minimal, there is not tendency to bind a foot, impact energy is absorbed by 'controlled' buckling or collapse of the structure (cylinder is illustrated) at a first zone of the cylindrical structure, not at the enclosed second zone of the cylindrical structure. The material thus gets 'softer' under load, as the collapsible structure continues to deform, and the structure of the pad resists 'bottoming out' as the load is absorbed by the second zone deformation which is relatively more resistant to deformation.

FIG. 7 is a sectional elevation of an embodiment of disclosed pad 100 in which the length of the column or cylinder has been exaggerated for illustrative purposes. Pad 100 has surface layer 110. Surface layer 110 is supported by column 120, comprising a column wall 124 and a central void 121. Column 120 may be any ready and appropriate shape, but regular geometric shapes are preferred, and a cylindrical or frustoconical shape is advantageous in case of production, and will be discussed here as the model for all such columns. (Except for particular discussion of the draft and other taper angles of column 120 in the frustoconical column model, for case of reference, the column will at times typically be referred to as a cylinder.) Column wall 124 has a column end 127, which is advantageously a tubular end, with the hollow center opening to void 121 within Column 120. Column wall 124 at column end 127 has a width d. In one embodiment the second end of the column is dome shaped and dome 128 forms an enclosed end of void 121.

Column wall 124 has two zones, a first zone 105 that is in the region of the column end 127 and a second zone 103 that is in the region of dome 128. Second zone 103 is relatively resistant to collapse, unlike first zone 105 which is designed not only to take all of the working load compression, but also the initial over load collapse or deformation, and is relatively much more compressible that second zone 103. First zone 105 typical compression is attended by a moderate deformation shown at paired dotted lines 109 as a slight bulge, both outward and inward (relative to the column's central axis), as the compressional forces (illustrated by arrows 101) work to compress the elastomeric material vertically in height and cause the material to bulge away from the wall's resting boundaries. As the load increases, either due to increased load, or due to an impact, first zone 105 actually buckles or collapses in severe deformation in the manner and in the directions indicated by paired dashed lines 107 and arrow 104. The material ceases essentially to compress or bulge further, and instead collapses outwardly (relative to the center axis of the column) in the characteristic buckled collapse shown schematically.

Second zone 103 acts mostly passively throughout both the early and then severe compression and deformation of first zone 105. Depending on forces involved and the dimensions and properties of the rubber and column, second zone 103 will exhibit only slight bulging, schematically represented by paired dotted lines 102. This difference is intentional and while other, as yet not fully appreciated, factors may be at work, it is believed that the pronounced differential in compression effect and eventual buckling collapse (first zone 105 only) is due to a significant difference in the geometry of zone 103 compared to zone 105.

First zone 105 starts out at column end 127 as relatively narrow in cross-section, increasing in thickness until it reaches an increase in wall thickness adequate to accomplish the deformation effect described above. Somewhere about in this region of column wall 124 is a virtual zone boundary 106. At and above this virtual zone boundary the material properties, abetted by increased cross-sectional thickness, simply stop supporting any ready compression or collapse. Above this virtual boundary, compression forces are essentially passed through to the first zone without bulge or other deformation effect inside the second zone, until and unless the second collapses completely, as in a most severe impact on surface layer 110 of pad 100. At such time the relatively less compressible second zone 103 nonetheless comes into play to prevent "bottoming out" by absorbing the extraordinary impact energies remaining after passing them through to first zone 105. Given enough impact force, Zone 105 will, in fact, deform as well, absorbing even more of the impact energy.

While the schematic illustration of FIG. 7 shows gradual tapering of first zone 105 up into second zone 103, crossing only a virtual boundary 106 between the zones, other embodiments will make the boundary explicit by employing increased thickening upwards in other than gradual or tapered fashion. For instance, and not by way of limitation, second zone 103 could have a sudden thickness change, perhaps even by way of a thickened step at or around boundary 106, so that the increased thickness is suddenly achieved, rather than gradually.

Figure 8:
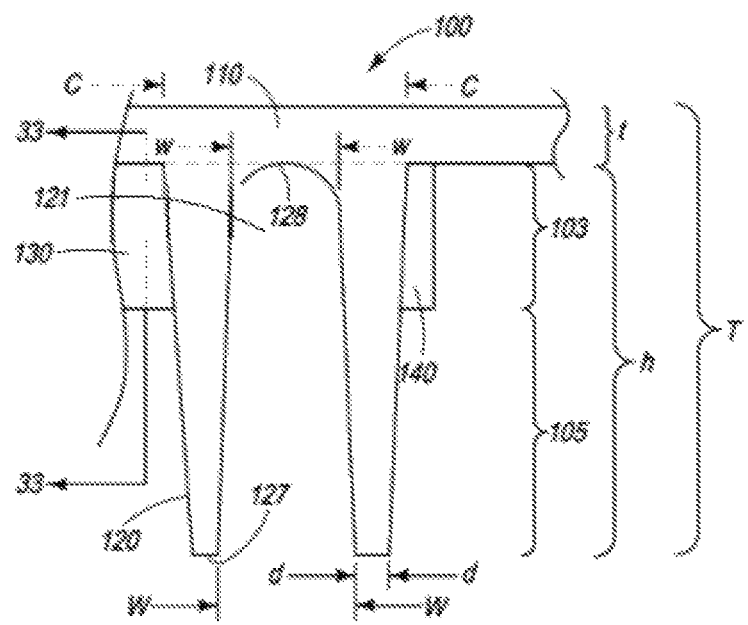
FIG. 8 is a sectional elevation of an alternate embodiment of the disclosed mat with certain elements exaggerated for clarity.

FIG. 8 is a sectional elevation of an embodiment of disclosed pad 100 in which the length of the column or cylinder has been exaggerated for illustrative purposes. Column 120 has width C at the enclosed end of the column, just under the upper layer 110. Void 121 has an uppermost width w, just before any dome 128. In this alternate embodiment, column has a stiffening rib 140 and/or a linkage or bridge 130 connecting to other columns and to the underside of surface layer 110. (See also FIG. 3.) In either case, the effect of the rib 140 or link 130 is to make the relatively less collapsible zone 103 that much stiffer and so enhance the effects (discussed for FIG. 7) for second zone 103. At least one effect is that, to the extent a rib 140 or link 130 is joined to column 120, the column width at that point is significantly and effectively greater than below the rib or link, or elsewhere around the column. The rib or link optionally have a taper which may optionally end in a rounded rib end or a flat end.

Column base 127 has a width d, and void opening 108 has a width W, where, for cylindrical or conical column enclosing a cylindrical or conical void, the area A of the column base is given by the formula:

$$A=(\pi/4)*((W+2d)^2-W^2).$$

Figure 9:
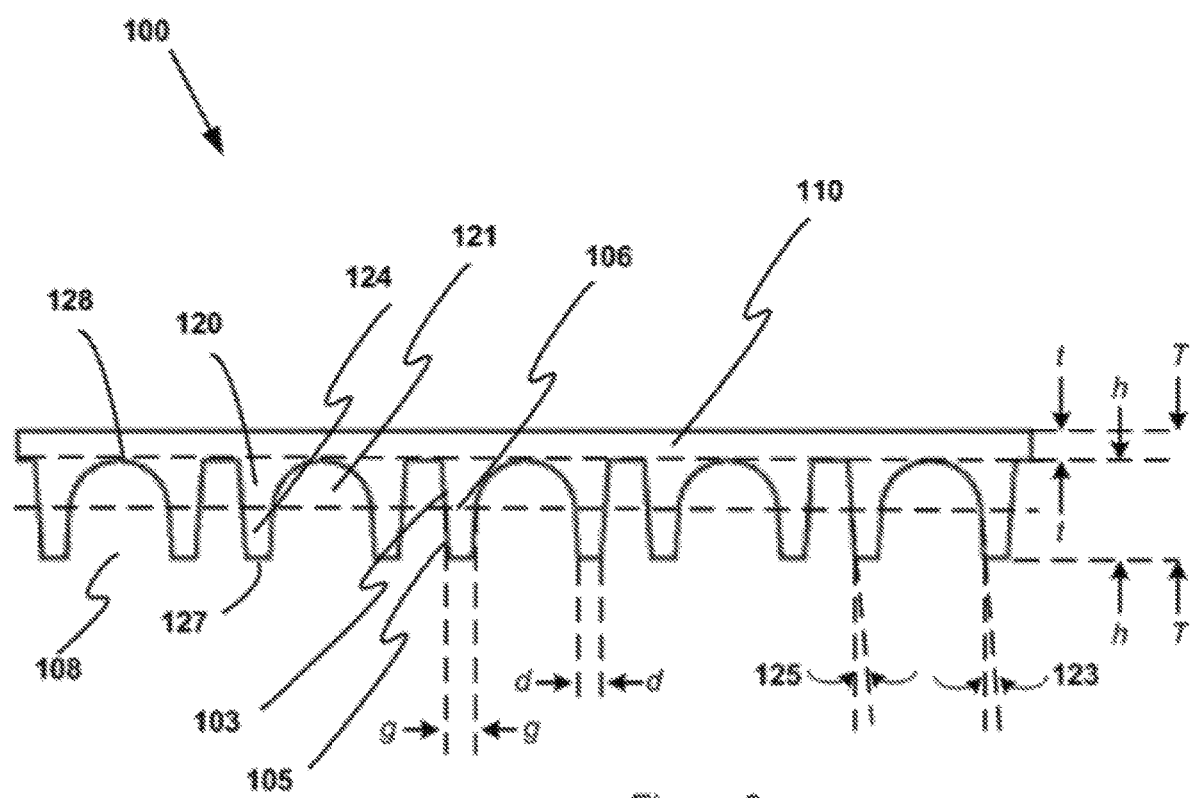
FIG. 9 is a sectional elevation of an alternate embodiment of the disclosed pad.

FIG. 9 is a sectional elevation of an embodiment of disclosed pad 100. This embodiment is a structure having a height suitable, for example, for inclusion in athletic footwear. Where our previously patented technology recommended pad thickness of about 0.9 inch for effective stress attenuation, the disclosed pad of FIG. 9 is effective for thicknesses as small as around 0.1 of an inch. For example, and not by way of limitation, this embodiment might have an advantageous thickness of 0.115 inch.

This embodiment comprises column 120, central void 121, column wall 124 and column end 127 as discussed above for FIG. 7. In this new embodiment our new technology is achieving surprising effectiveness with advantageous column heights in the range of 0.080 to 0.092 inch.

The embodiment also comprises a relatively collapsible first zone 105 and a relatively less collapsible second zone 103 of the column wall with all the impact absorbing characteristics described above for FIG. 7. In our previously patented technology, it was believed that the column wall thickness increase should not exceed about 125% of the base width d in order to achieve the above described effect. Recently our own research into smaller and smaller thicknesses of padding has returned surprising results: increases in column wall thickness by 25-40% (that is, 125-140% of width d) have proven quite effective. Somewhere in this region of column wall 124, that is where the wall thickness increases between 125% and 140%, is the virtual zone boundary 106. For example, for a nominal column wall, cross-sectional thickness of 0.0208 inch at the first end of the first zone and a thickness of 0.0273 inch at the boundary of the first zone the increase in wall thickness from one end of the first zone to the other end is 131%.

For a nominal pad height of 0.115 inch, virtual boundary 106 will be preferably located between about 0.040-0.055 inch and preferably 0.044 inch in height measured from the column base 127 along column wall 124, as is illustrated by dotted line 106.

Column 120 is advantageously a hollow truncated cone. Void 121 inside the cone starts at opening 108 and tapers, desirably, to the point of curvature of optional dome 128. Column wall 124 therefore has an inner column wall surface and an outer column wall surface, relative to the column's central axis. The outer surface of column wall 124 preferably tapers upwardly until it joins with surface layer 110. The outer wall surface thus has a draft angle 125, and the inner wall has draft angle 123.

Our research and development has also returned surprising results for the preferred outer and inner column wall draft angles. Where our previous technology for a pad of about 0.9 inch in thickness, required outside and inside draft angles between 1 and 5 degrees, our new advances have shown that in thinner applications, for example a nominal pad of a height in the range 0.1-0.15 inch, the preferred draft angles will be in the ranges of greater than 6 degrees and less than 10 degrees. For the above example with a nominal overall height of 0.115 inch, the draft angles would advantageously, be about 9.2 degrees for angle 125 and about 7.47 degrees for angle 123.

In one embodiment of FIG. 9, density of columns 120 under surface layer 110 is based on a preferred inner column diameter of about 0.0936 inch, and an outer column diameter of about 0.1352 inch, and the column wall thickness at column end 127, that is the width d, would therefore be approximately 0.0208 inch. The column wall thickness at virtual boundary 106, indicated by width g would/be about 0.0273 inch.

Columns may be placed under surface layer 110 in varying configurations and spaced at various distances. Advantageously, for the nominal measurements discussed above, columns are placed under surface layer 110 in an array with the central axes of columns 120 placed on about 0.18 inch centers. (See FIG. 4.)

Surface layer 110 has a thickness t, as is indicated by paired arrows t, and column 120 has a height h as is indicated by paired arrows h, and pad 100 has overall thickness T, as is indicated by paired arrows T, wherein T=h+t.

Where our previously patented technology taught that the ratio of h:t would advantageously be greater than 3.5, our newest research has determined that ratios less than that—in the range greater than 1.3 and less than 3.5 are effective for the thinner mats and pads disclosed herein. For example, for a nominal overall thickness T of about 0.1115 inch, a preferred thicknesses of surface layer t of 0.026 inch and a preferred height h of 0.0855 inch, the h:t ratio is 3.29.

Figure 10:
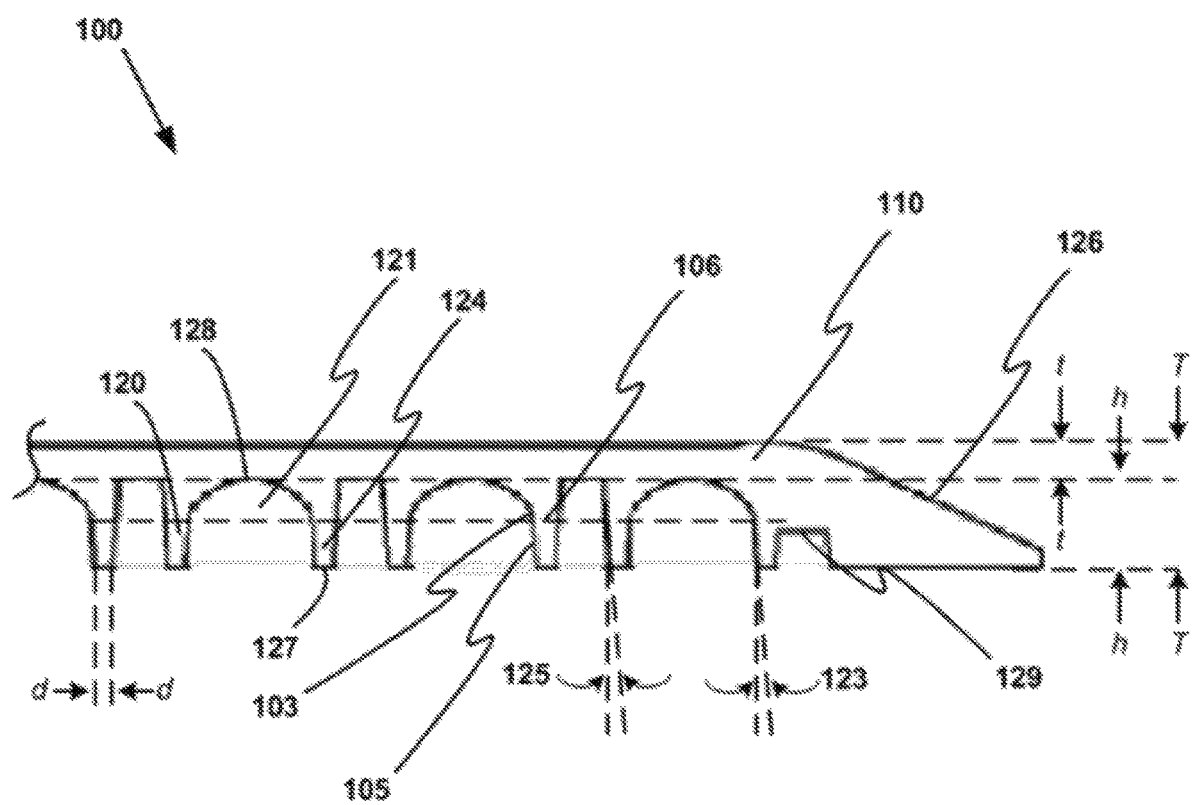
FIG. 10 is a sectional elevation of an alternate embodiment of the disclosed mat.

FIG. 10 is a sectional elevation of an embodiment of disclosed pad 100. This embodiment is a structure of a height suitable, for example, for use in thinner, less-intrusive anti-fatigue matting, for example in mats between 0.35 and 0.5 of an inch in total height. This embodiment comprises column 120, central void 121, column wall 124 and column end 127 as discussed above for FIG. 7. For a mat with a nominal height of 0.445 inch, a column height of 0.30 to 0.32 inch is advantageous.

The embodiment also comprises a relatively collapsible first zone 105 and a relatively less collapsible second zone 103 with all the impact absorbing characteristics discussed above for FIG. 7.

As in FIG. 9, zone 105 in FIG. 10 starts out at column end 127 as relatively narrow in cross-section, increasing in thickness until it reaches an increase in wall thickness adequate to accomplish the deformation effect described above. As previously discussed, in our own previous technology, it was believed that the column wall thickness increase should not exceed about 125% of the base width d in order to achieve the above described effect. Recently to however our own research into smaller thicknesses of padding have returned surprising results: increases in the column wall thickness by 25-40% (that is, 125-140% of width d) have proven very effective. Somewhere in this region of column wall 124, where the wall thickness increases between 125% and 140%, is the virtual zone boundary 106. For example, with a column wall cross-sectional thickness of 0.0625 inch at the first end of the first zone and a thickness of 0.086 inch at the boundary of the first zone, the increase in wall thickness from one end of the first zone to the other end is 138%.

For a nominal overall height of 0.445 inch, for example, the first zone is advantageously in the range of 0.15 to 0.175 inch in height and desirably 0.165 inch in height measured from the first end of the column.

In FIG. 10, column 120 is also of a frusto-conical shape with tapering column wall 124 and dome 128, as is discussed above for FIG. 9. This alternate embodiment (FIG. 10) also comprises inner and outer column wall angles 123 and 125. As with the embodiment of FIG. 9, new and advantageous draft angles apply; draft angles in the range of 6-10 degrees rather than draft angles between 1-5 degrees. However in this embodiment, optimally the draft angles will be approximately equal. For a nominal pad of a height about 0.445 inch for this embodiment, the preferred draft angles will be about 8 degrees for both angle 125 and angle 123. For these dimensions, virtual boundary 106, illustrated by dotted line 106, will be located about 0.165 inch from the column base 127 along column wall 24.

In this alternate embodiment, density of columns 120 under surface layer 110 is based on a preferred inner column diameter of about 0.450 inch, and an outer column diameter of about 0.575 inch, and the column wall thickness at column end 127, that is the width d, would therefore be approximately 0.0625 inch. The column wall thickness at virtual boundary 106, would be about 0.086 inch.

The alternate embodiment of FIG. 10 also has surface layer 110 with a thickness t, as is indicated by paired arrows t, and column 120 has a height h as is indicated by paired arrows h, and pad 100 has overall thickness T, as is indicated by paired arrows T, wherein T=h+t, as is discussed above for FIG. 9. Where our previous technology taught that the ratio of h:t would advantageously be greater than 3.5, our newest research has determined that ratios less than that, in the range of 1.3 and less than 3.5, are now effective for the mats and pads disclosed herein. For example, for a nominal overall thickness T of about 4.445 inch, a preferred thicknesses t of about 0.135 inch and a preferred height h of 0.310 inch, the h:t ratio is 2.3.

In the case of the pad structure of FIG. 10 being used as an anti-fatigue matting system, the mat optionally has an integral ramp 126 upon at least one edge of the mat, and a set of single ribs 129 may connect a peripheral outer border of columns to a base of the integral ramp.

In FIG. 11, a graph of curves of peak impact forces vs drop height is presented. It is different from force vs displacement curves presented in previous disclosures. It is believed that such a graph provides more functionally applicable data concerning the capacity of the structures for absorbing impact shock which is the purpose for which they were designed. In the graph, curves representing the new structures are compared to a previously patented structure (½ inch thickness).

For the data presented in the graph, peak impact forces (G max) were measured on three different embodiments using missile E in accordance with ASTM procedure F355-10a. G max was plotted as a function of drop height in inches. The curve to the left is from data plotted with a 3 mm thick Nano Cell embodiment, the middle curve is from a from a ⅜ inch thick pad, and the curve on the right is from a prior art ½ inch pad.

Mats are generally and advantageously made of an SBR/EPDM/natural rubber elastomeric material with the following properties: Shore A Durometer of 40 to 70 (more particularly 40-50 and advantageously about 44) measured on the surface of the mat; modulus of about 0.5 MPa to about 4 MPa, and advantageously at about 0.69 Mpa.

Preferred substructures can be on a uniform grid or in a honey-combed configuration. Preferred substructures can be of circular, elliptical, or multi-sided shape from three sided to 20 sided or more. Preferred substructures can have a shared wall configuration without elastomeric bridge linkage between the cylinders on the one hand, or can alternatively be joined to one another by elastomeric linkages as discussed above for FIGS. 8 and 10.

With regard to systems and components above referred to, but not otherwise specified or described in detail herein, the workings and specifications of such systems and components and the manner in which they may be made or assembled or used, both cooperatively with each other and with the other elements disclosed herein to effect the purposes herein disclosed, are all believed to be well within the knowledge of these skilled in the art. No concerted attempt to repeat here what is generally known to the artisan has therefore been made.

INDUSTRIAL APPLICABILITY

Standing for long periods on hard surfaces is perceptually and subjectively uncomfortable and leads to fatigue. A properly designed anti-fatigue mat increases comfort and reduces tiredness and swelling of the feet and legs. Disclosed mats are tuned to the ideal level of compliance that research shows maximizes anti-fatigue performance. Optimized performance ensures stability and support while reducing pressure on the feet, reducing leg shock and maximizing fatigue reduction. Conventional compliant flooring materials compact and get hard when they are compressed. The unique structures disclosed herein are actually firm to the touch, but then get softer as applied pressure is increased. Working people who must stand at their jobs are more productive when less fatigued and have less back, foot and leg pain. This generally lead to fewer accidents.

In working situations, where the height of a work surface is standardized, the thickness of anti-fatigue matting is problematic. Workers become used to the work surface being at a relative distance to their hands and eyes, and adjustment to 'raising the floor' is resisted. Anti-fatigue matting that is in a height range of 0.25 to 0.5 inch fills the need for reducing fatigue and injury while allowing normal perception of floor height.

Impact and shock absorbing pads are also used on or within many types of sports equipment and shoes. The pads used in the cushioning and stabilizing systems of athletic shoes, for example, shoes for hiking, running, jogging, court and field sports and aerobic exercise, must deliver adequate cushioning to reduce fatigue and impact injury while providing proper stabilization to reduce falls and muscular stress injury, all while delivering enough force interaction with the environment to achieve the purpose of the athletic movement.

Impact and shock absorbing pads in other athletic equipment requiring padding, such as rifle butt pads, helmet pads, shoulder, knee and elbow pads, gloves, and so forth, must prevent impact injury and cushion against repetitive impact stress.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

We claim:

1. A resilient pad system comprising at least one pad, the pad comprising a plurality of supporting resilient substructure hollow columns, each such column having a column wall that is tapered from a first end to an enclosed second end;

the column wall surrounding a central void, the void extending from the first end to the enclosed second end of the column;

wherein the cross-sectional thickness of the column wall increases from the first end to the enclosed second end by a percentage within a range of greater than 125% and less than 140%; and further wherein the column wall is tapered both inside and out, with an outside wall draft angle greater than 6 degrees and less than 10 degrees, and an inside wall draft angle greater than 6 degrees and less than 10 degrees.

2. The resilient pad system of claim 1 wherein the column wall taper forms a frustoconically shaped column.

3. The resilient pad system of claim 1 wherein the enclosed second end of the column is in the form of a dome.

4. The resilient pad system of claim 1 wherein the outside draft angle is greater than the inside draft angle.

5. The resilient pad system of claim 1 wherein the outside draft angle is approximately equal to the inside draft angle.

6. The resilient pad system of claim 1 wherein the pad system has a cross-sectional pad thickness T, each central void defined by the column walls has a relatively uniform height h within the cross-sectional thickness T, and a cross-sectional thickness t extends beyond the enclosed end of the central voids within the cross-sectional thickness T, such that T=t+h; and the ratio of h:t is greater than 1.3 and less than 3.5.

7. The resilient pad system of claim 6 wherein the ratio of h:t is greater than 1.3 and less than 2.4.

* * * * *